W. J. HOSKYNS.
VEHICLE TOP.
APPLICATION FILED AUG. 26, 1916.
1,230,580.
Patented June 19, 1917.
2 SHEETS—SHEET 1.
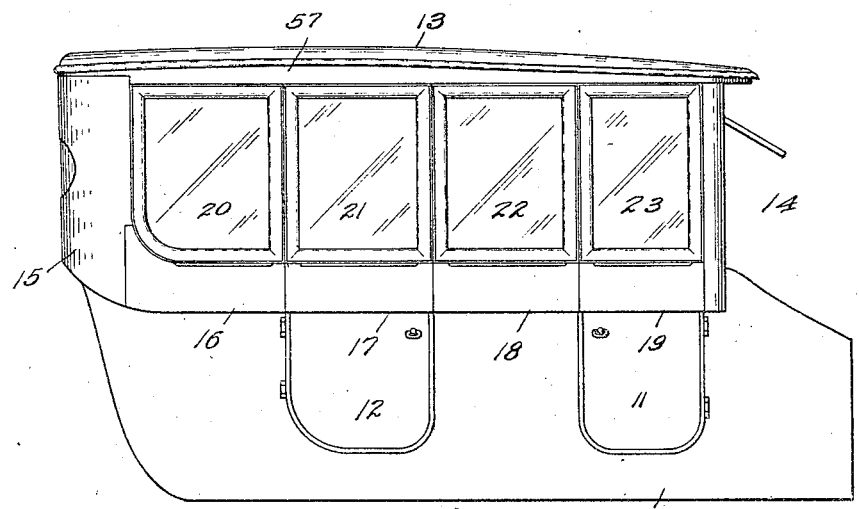
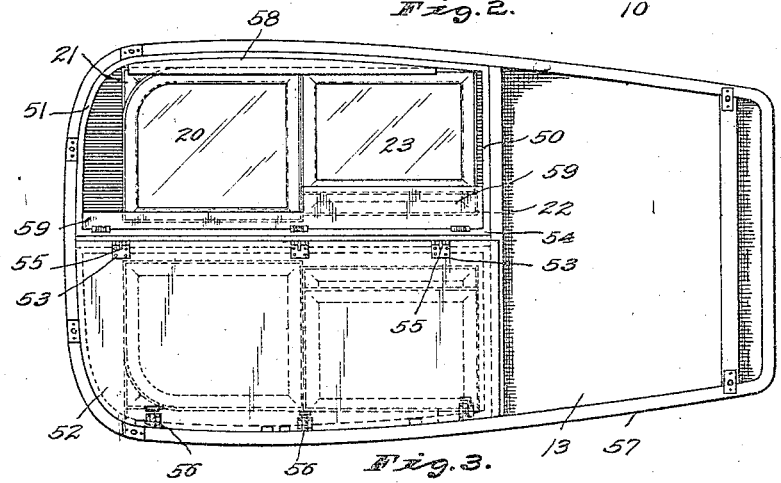
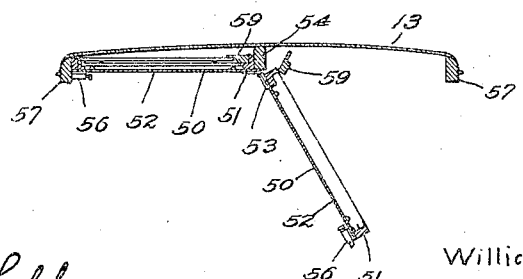
WITNESSES:
Frank A. Fahle
Josephine Gasper
INVENTOR
William J. Hoskyns,
BY
Hood & Ashley.
ATTORNEYS W. J. HOSKYNS.
VEHICLE TOP.
APPLICATION FILED AUG. 26, 1916.
1,230,580. Patented June 19, 1917.
2 SHEETS—SHEET 2.
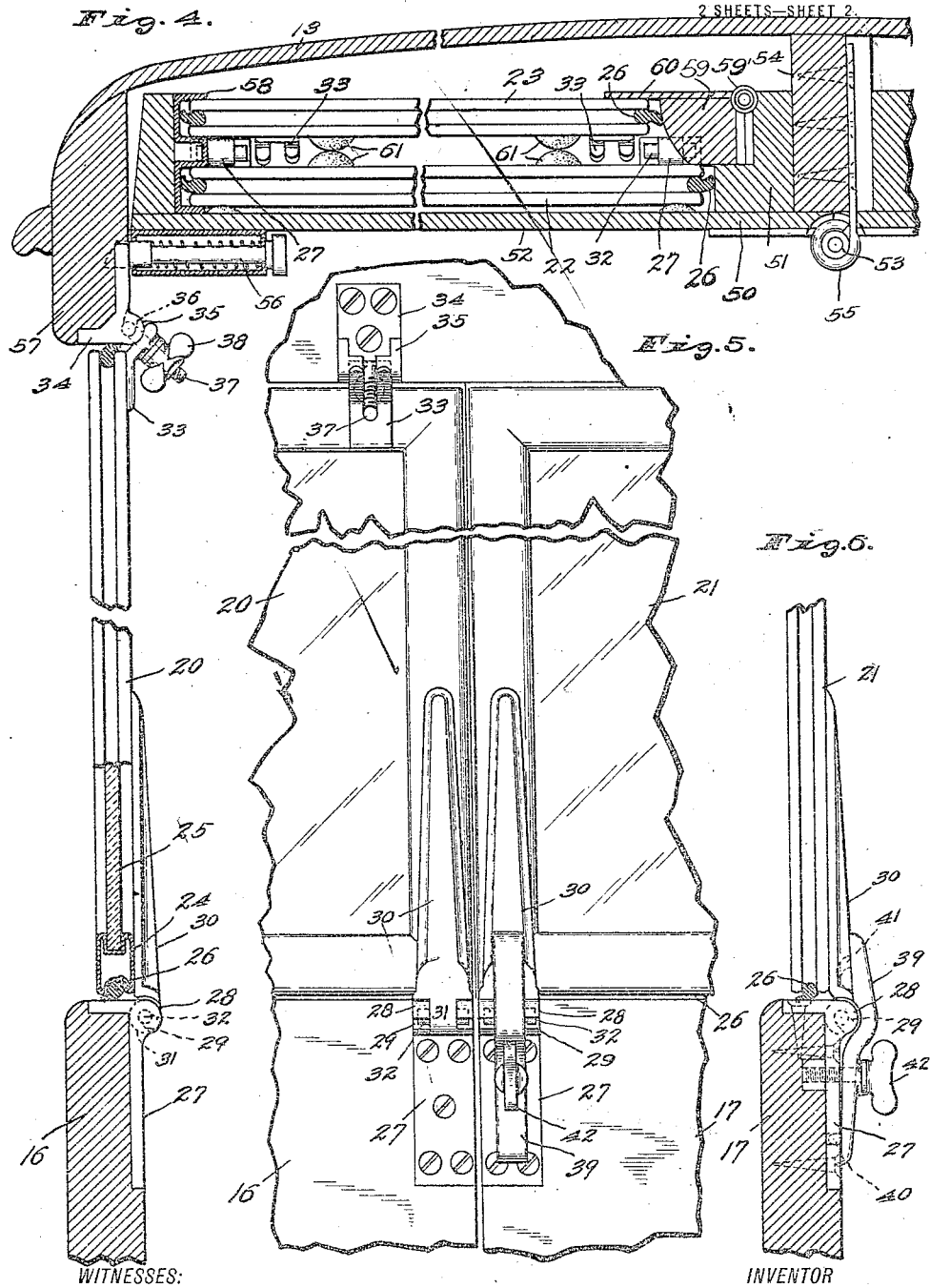
WITNESSES:
Frank A. Fable
Josephine Gasper
INVENTOR
William J. Hoskyns,
BY
Hood & Schley.
ATTORNEYS

UNITED STATES PATENT OFFICE.

WILLIAM J. HOSKYNS, OF DETROIT, MICHIGAN, ASSIGNOR TO FRANK E. SMITH, OF INDIANAPOLIS, INDIANA.

VEHICLE-TOP.

1,230,580.  Specification of Letters Patent.  Patented June 19, 1917.

Application filed August 26, 1916. Serial No. 116,951.

*To all whom it may concern:*

Be it known that I, WILLIAM J. HOSKYNS, a citizen of the United States, residing at Detroit, in the county of Wayne and State of Michigan, have invented a new and useful Vehicle-Top, of which the following is a specification.

It is the object of my present invention to provide a convenient arrangement for disposing of the rigid windows of all-season vehicle tops, especially automobile tops, when it is desired to have the window spaces open.

In carrying out my invention, I make the windows, which are of glass in suitable frames, separable from the portions to which they are attached when in place, and provide in the roof of the automobile top certain downwardly opening pockets for receiving these windows which are thus removed, the pockets being provided with suitable means for holding the windows firmly within them.

The accompanying drawings illustrate my invention. Figure 1 is a side elevation of a touring car body provided with an all-season top embodying my invention, with the windows in place; Fig. 2 is an under view of the roof, showing the swinging window-containing pockets, with the windows stored therein, the floor of one of the pockets being removed so as to show more clearly the windows above it; Fig. 3 is a transverse vertical section through the roof at the pockets, showing one pocket swung up into place with the windows stored therein, and the other lowered with the windows removed from it; Fig. 4 is an enlarged partial vertical section through the roof at the pockets, and through part of the side, showing the fastening devices for the windows both in the pockets and in the window-receiving spaces; Fig. 5 is a partial elevation taken from within the car, showing the fastening of the windows in the window-receiving spaces over the fixed side portions of the main body and over the doors; and Fig. 6 is a section similar to part of Fig. 4, showing the window-fastening means over a door.

The vehicle body 10 is shown as of the touring car type, with a front side door 11 and a rear side door 12. This vehicle body is provided with an all-season top, comprising a roof 13 which rests on the wind shield frame 14 in front and a rear upright support 15 in the rear, and side sill portions 16, 17, 18, and 19 attached to the fixed portions and to the swinging doors of the side of the body 10, the portions 17 and 19 swinging with the doors 12 and 11 respectively. These sill portions conveniently overlap the subjacent body portions. The details of the mounting of these parts 13 to 19 inclusive form no part of the invention covered by the present application.

Mounted over the side sill portions 16, 17, 18, and 19 are windows 20, 21, 22, and 23 respectively, on each side of the car. Each of these windows comprises a hollow sheet metal frame 24 of the proper shape, which frame is grooved on the inner edge to hold the glass pane 25 and grooved on the outer edge to receive and clamp a rubber strip 26 which projects beyond the frame 24 normally in the plane of the window. The projecting portions of the rubber strips 26 are comparatively thin and project sufficiently far so that with the rubber strips the window is slightly larger than the space which is to receive it, and the rubber at the top and bottom of the windows and at the front of the windows 23 and the rear of the windows 20 will be bent when the window is put in place so as to make a tight joint, as clear from Fig. 4. The rubber strips at the other vertical edges of the windows overlap with the strips of the adjacent edges of the adjacent windows, thereby also forming tight joints while permitting the removal of any window.

These windows are all bodily removable, so that they can be taken completely away from their respective window spaces. To this end, each side sill portion 16, 17, 18, and 19 is provided at each upper inner corner with an angle plate 27, which at its corner is provided with a pair of spaced lugs 28 provided with obliquely downwardly opening grooves 29 which extend from the inner faces of such lugs almost but not quite to the outer faces thereof, as clear from Fig. 5; and each lower corner of each window is provided with a projecting arm 30 having a finger 31 which fits between the two spaced lugs 28 and is provided with a cross pin 32 which fits in the grooves 29. This construction forms a separable hinge. By tilting the window into the vehicle slightly, it may be slid obliquely downward to separate the pins 32 from the grooves 29, thus detaching the window. By reversing this operation the window may be put in place; and as the window is swung upward to a vertical position the rubber strip 26 at the bottom thereof engages the upper edge of the sill portion and the pins 32 are firmly seated in the grooves 29, the parts being so proportioned that this occurs by the time the window reaches the vertical.

In order to hold the windows in vertical position when they are in place, different devices are used for the fixed windows 20 and 22 over the sill portions 16 and 18 and for the swinging door windows 21 and 23 over the sill portions 17 and 19. At the upper edges of the windows 20 and 22 there are provided projecting bifurcated plates 33, which register with angle plates 34 corresponding to the angle plates 27 and are provided with similar spaced lugs 35 having obliquely upwardly opening grooves 36 which open to the inner faces of such lugs but not to the outer faces thereof. A T-head bolt 37 has its head engageable in the slots 36 while its shank passes through the spaces between the lugs 35 and the bifurcations of the plate 33, to receive a wing nut 38 to lock the plate 33 against the lugs 35, thus holding the upper edge of the window firmly in place. This fastening at the upper edge of the window cannot conveniently be used for the windows 21 and 23 over the swinging doors 12 and 11 respectively, so that instead I provide at the lower edges of such windows removable clamping plates 39 provided with pins 40 and 41 for entering holes in the angle plate 27 and the arms 30, the pin 41 and its hole preferably being curved as shown in Fig. 6, so as to prevent the window 21 (or 23) from tilting outward. The plates 39 are held in clamping position by wing bolts 42 coöperating with threaded holes in the angle plates 27. By unscrewing the wing nuts 38 and the wing bolts 42, the T-bolts 37 may be swung upward and the plate 39 may be removed to permit the windows to be tilted from the vertical for removal.

In order to store the windows when they are removed, swinging pockets 50 are provided in the under side of the roof 13. Each of these swinging pockets comprises a frame 51 carrying a floor 52, conveniently of artificial "board," which may carry suitable finishing material to provide the visible under face of the roof. There are conveniently two of these pockets, arranged side by side and mounted by hinges 53 common to the two pockets on the central longitudinal member 54 of the roof, so that the hinge axis is in the medial longitudinal line of the roof. The hinges are conveniently provided as ordinary two-wing hinges, with a third wing attached to the longitudinal member 54 and provided with an eye 55 surrounding the hinge pin, so that either pocket may be swung down independently of the other. The pockets are held in their upper or closed positions by spring latches 56 coöperating with suitable holes in the longitudinal side bars 57 of the roof 13.

The pockets 50 have window-receiving spaces in their upper faces, so that the windows are totally concealed when the pockets are raised. These window-receiving spaces in the pockets are provided with suitable means for holding the windows firmly in place therein. This holding means may take various forms. In the form shown, where two windows are placed one on top of the other in each pocket, there may be near the outer edge of the pocket (which is the lower edge when the pocket is opened) a pair of sheet metal channels 58 of proper width to receive the window frame 24; while at the inner edge of the pocket (which is the upper edge when the pocket is opened) the longitudinal strip of the pocket frame 51 may form an abutment for the edge of the wider window which is placed in the pocket first (the window 22 as illustrated) and clamped there by a spring-hinged strip 59 which also forms an abutment for the edge of the narrower window 23 second to be placed in the pocket, the strip 59 being spring-pressed to closed position by its spring hinges 59' and being provided with a metal overhanging portion 60 which holds the window 23 in place. The rubber strips 26 around the edges of the windows bear against the bottoms of the channels 58 and against the longitudinal strips of the frames 51 and the hinged strips 59 to hold the windows resiliently but firmly in place. The windows are preferably put in the pockets so that their inner faces, which are provided with the arms 30 and 33, are adjacent, so that these arms on the two superposed windows may overlap and thus economize storage space. If desired, abutting rubber buffers 61 may be provided on these adjacent faces of the windows, so as to assist in holding them from relative movement.

In order to place the windows in or remove them from a pocket 50, the latches 56 holding such pocket upward in closed position are pulled out, and the pockets swung downward, as indicated in Fig. 3. Then the hinged strip 59 is swung upward, and the windows removed or put in place by first being slightly tilted. By this arrangement, the windows when removed are stored completely out of sight, but yet so they are readily accessible; and the attaching means which are provided are such that the windows may be readily put in place and removed from their positions in the window-receiving spaces at the sides of the vehicle body.

The specific mounting and construction of the detachable rigid windows, shown in this application, are claimed in my co-pending application Ser. No. 116,950, of even filing date herewith.

I claim as my invention:

1. In combination, a vehicle body provided with a roof supported from the body by upright portions to leave window spaces, and rigid windows for said window spaces, said windows being detachably mountable in said window spaces, and said roof being provided with downwardly movable pockets for carrying said windows when they are removed from the window spaces.

2. In combination, a vehicle body provided with a roof supported from the body by upright portions to leave window spaces, rigid windows for said window spaces, said windows being detachably mountable in said window spaces, and a window-carrying pocket hingedly mounted in said roof for carrying said windows when they are removed from said window spaces.

3. In combination, a vehicle body provided with a roof supported from the body by upright portions to leave window spaces, rigid windows for said window spaces, said windows being detachably mountable in said window spaces, and a pair of downwardly swinging window-carrying pockets hingedly mounted on the under face of the roof on a single hinge axis for carrying said windows when they are removed from said window spaces, the axis of said hinge mounting extending longitudinally of the roof on substantially the medial line thereof.

4. In combination, a vehicle body provided with a roof supported from the body by upright portions to leave window spaces, rigid windows for said window spaces, said windows being detachably mountable in said window spaces, and a pair of downwardly swinging window-carrying pockets hingedly mounted on the under face of the roof on a single hinge axis for carrying said windows when they are removed from said window spaces.

5. In combination, a vehicle body provided with a roof supported from the body by upright portions to leave window spaces, rigid windows for said window spaces, said windows being detachably mountable in said window spaces, and a downwardly swinging window-carrying pocket hingedly mounted on the under face of the roof for carrying said windows when they are removed from said window spaces, the axis of said hinge mounting extending longitudinally of the roof.

6. In combination, a vehicle body provided with a roof supported from the body by upright portions to leave window spaces, rigid windows for said window spaces, said windows being detachably mountable in said window spaces, and a pair of downwardly swinging window-carrying pockets hingedly mounted on the under face of the roof for carrying said windows when they are removed from said window spaces, the axis of said hinge mounting extending longitudinally of the roof.

7. In combination, a vehicle body provided with a roof supported from the body by upright portions to leave window spaces, rigid windows for said window spaces, said windows being detachably mounted in said window spaces, and a pair of oppositely downwardly swinging window-carrying pockets hingedly mounted on the under face of the roof for carrying said windows when they are removed from said window spaces.

8. In combination, a vehicle body provided with a roof supported from the body by upright portions to leave window spaces, rigid windows for said window spaces, said windows being detachably mountable in said window spaces, and a window-carrying pocket hingedly mounted in said roof for carrying said windows when they are removed from said window spaces, and means in said pockets for holding said windows firmly in place therein.

9. In combination, a vehicle body provided with a roof supported from the body by upright portions to leave window spaces, rigid windows for said window spaces, said windows being detachably mountable in said window spaces, a pair of downwardly swinging window-carrying pockets hingedly mounted on the under face of the roof on a single hinge axis for carrying said windows when they are removed from said window spaces, and means in each of said pockets for holding a window firmly in place therein.

10. In combination, a vehicle body provided with a roof supported from the body by upright portions to leave window spaces, rigid windows for said window spaces, and a window-carrying pocket movably supported on the under face of the roof, said windows being movable either into the window spaces or into the pockets.

11. In combination, a vehicle body provided with a roof supported from the body by upright portions to leave window spaces, rigid windows for said window spaces, a window-carrying pocket movably supported on the under face of the roof, said windows being movable either into the window spaces or into the pockets, and means for locking said windows in either of such positions.

In witness whereof, I have hereunto set my hand at Detroit, Michigan, this twenty-third day of August, A. D. one thousand nine hundred and sixteen.

WILLIAM J. HOSKYNS.